United States Patent
Koch

[11] 3,953,141
[45] Apr. 27, 1976

[54] LOCK FOR THE INNER RACE OF SELF-ALIGNING BUSHING ON A SHAFT

[75] Inventor: Hans W. Koch, Levittown, Pa.

[73] Assignee: Roller Bearing Company of America, West Trenton, N.J.

[22] Filed: Feb. 27, 1975

[21] Appl. No.: 553,800

[52] U.S. Cl. ............................. 403/259; 308/236
[51] Int. Cl.² ........................................ F16D 1/06
[58] Field of Search .......... 403/261, 258, 259, 260; 308/236, 72

[56] References Cited
UNITED STATES PATENTS

| | | | |
|---|---|---|---|
| 963,296 | 7/1910 | Junggren | 308/72 UX |
| 1,778,258 | 10/1930 | Jennings | 308/236 |
| 1,894,414 | 1/1933 | Olson | 308/236 |
| 2,312,648 | 3/1943 | Jones | 308/72 X |
| 2,317,070 | 4/1943 | Tourneau | 403/259 X |
| 2,439,284 | 4/1948 | Buckwalter | 287/DIG. 8 |

Primary Examiner—Andrew V. Kundrat
Attorney, Agent, or Firm—Jackson, Jackson & Chovanes

[57] ABSTRACT

The invention relates to a new lock for the inner race of a self-aligning bushing to a shaft.

8 Claims, 10 Drawing Figures

LOCK FOR THE INNER RACE OF SELF-ALIGNING BUSHING ON A SHAFT

The invention relates to a lock for the inner race of a self-aligning bushing to the outside diameter of a shaft.

PRIOR ART

In the prior art there have been several different procedures used for locking the inner race of a self-aligning bushing with respect to the shaft. The locking is important because when the shaft is part of a large integral unit, the replacement of the shaft due to wear would be a major repair job and this is true when the heat treatment of the shaft would be not possible or too expensive.

One usual way of locking the inner race to a shaft is by a press fit. However, for assembly reasons (in field repair and replacement) a press fit is not desirable. Also, experience has shown that even with a press fit the inner race will yield to certain dynamic load conditions resulting in relative movement between the inside (bore) of the inner race and the shaft.

Another common way to affix the inner race to the shaft is by a shrink fit. This method is also not satisfactory since it does not provide the ease of assembly and disassembly desired in field repair.

Another possible procedure is by clamping the inner race on its two parallel end faces. The clamping force needed to secure the inner race from rotating under dynamic load, however, must be in excess of the torque on the spherical diameter.

The torque at the spherical diameter is a function of the radial load times the radius, times the coefficient of friction. The axial clamping force is a function of the axial force (generated by bolts) times the mean face radius, times the coefficient of friction.

In many cases the axial clamping force will be less than the torque at the spherical diameter and, therefore, relative movement between inner race and shaft can take place.

Other known procedures are:

Securing the inner race to the shaft with dowel pin or with key and keyway.

These procedures have been unsuccessful, due to the high local stress concentration involved, commonly resulting in fracturing of the inner race.

DRAWINGS

In the invention drawings illustrating various means of achieving the new shaft lock are appended, without any intention to limit the invention.

Like numerals describe like parts.

DESCRIPTION OF THE INVENTION

In the invention a means for preventing relative motion between the inner race and the shaft is shown which does not introduce lock stress concentration or other defects.

Figure 1:
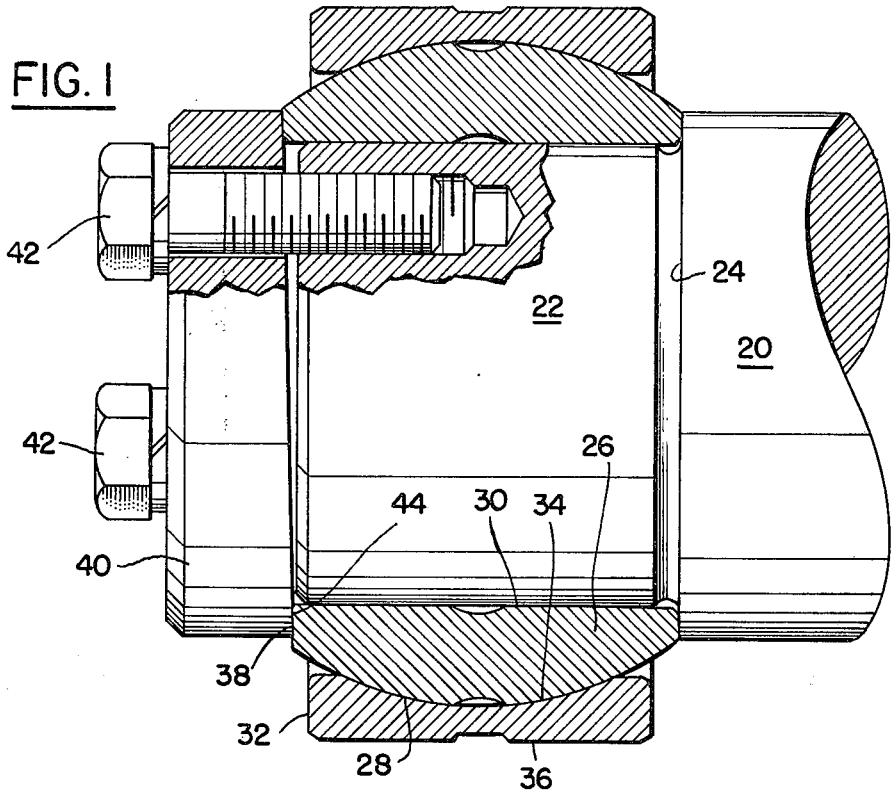
FIG. 1 is a fragmentary axial section of the end of the shaft and the races and end plate.
Figure 2:
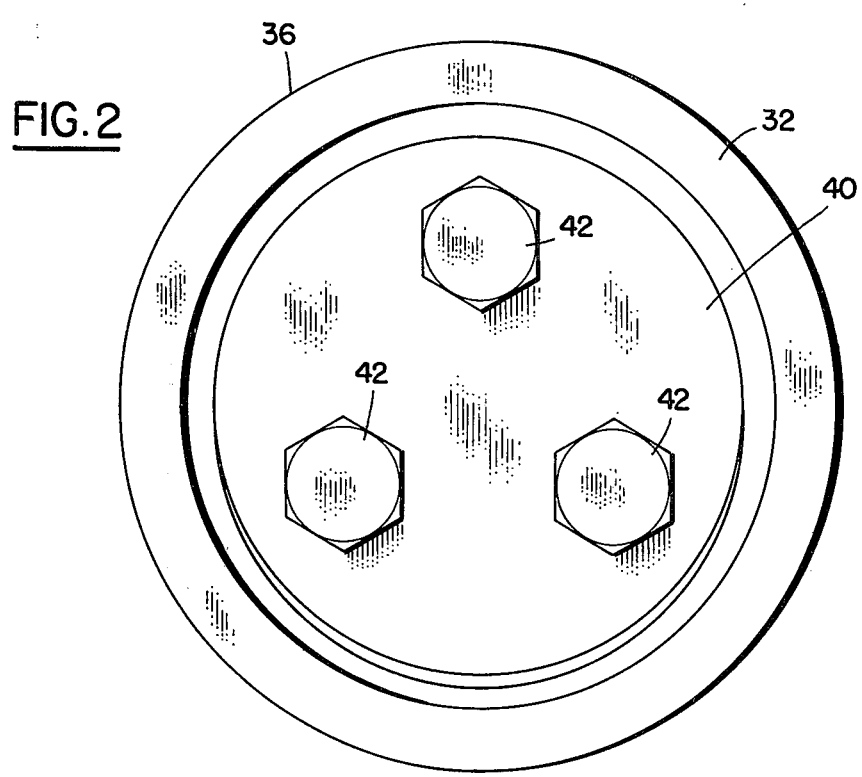
FIG. 2 is a left end view of FIG. 1.

In FIGS. 1 and 2, a shaft 20 is shown having a reduced end 22 which forms a shoulder 24. A bushing having an inner race 26 fits on the reduced end of the shaft against the shoulder and has an outside spherical portion 28 and a bore 30.

On the inner race is an outer race 32 which has an inner spherical portion 34 which engages the spherical portion 28 of the inner race 26. The outside portion 36 of the outer race is used to engage some piece of equipment.

Over the reduced end 22 of the shaft and engaging the end face 38 of the inner race, I place a circular end plate 40 which is secured to the end of the shaft by bolts 42, having suitable lock washers.

The end plate 40 has a surface 44 which engages the end of the race 38 and is machined (ground) to conform to it. The surfaces 44 and 38 are ground at an angle which is not a right angle with respect to the axis of the shaft, but is close to a right angle to exert a locking force on the inner race against the shoulder 24.

Figure 3:
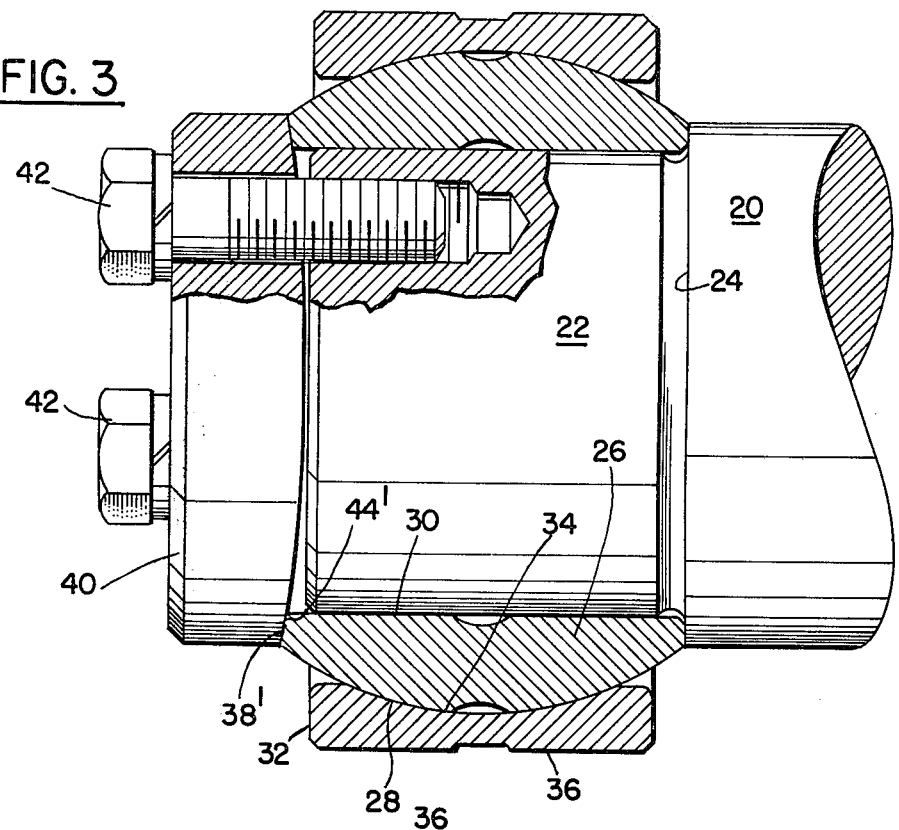
FIG. 3 is a modification of the invention as shown in FIG. 1, illustrating the axial section.
Figure 4:
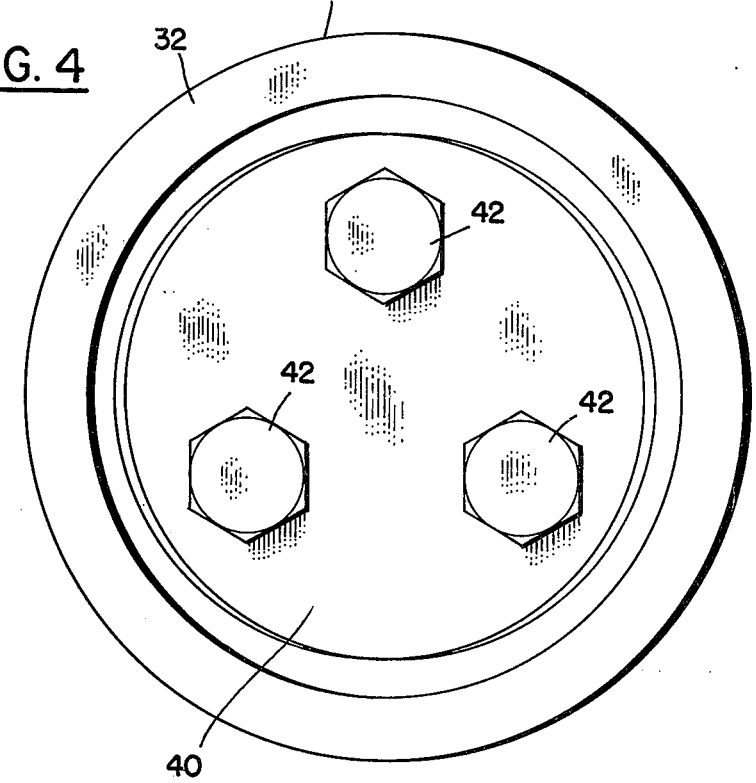
FIG. 4 is a left end view of the modification.
Figure 5:
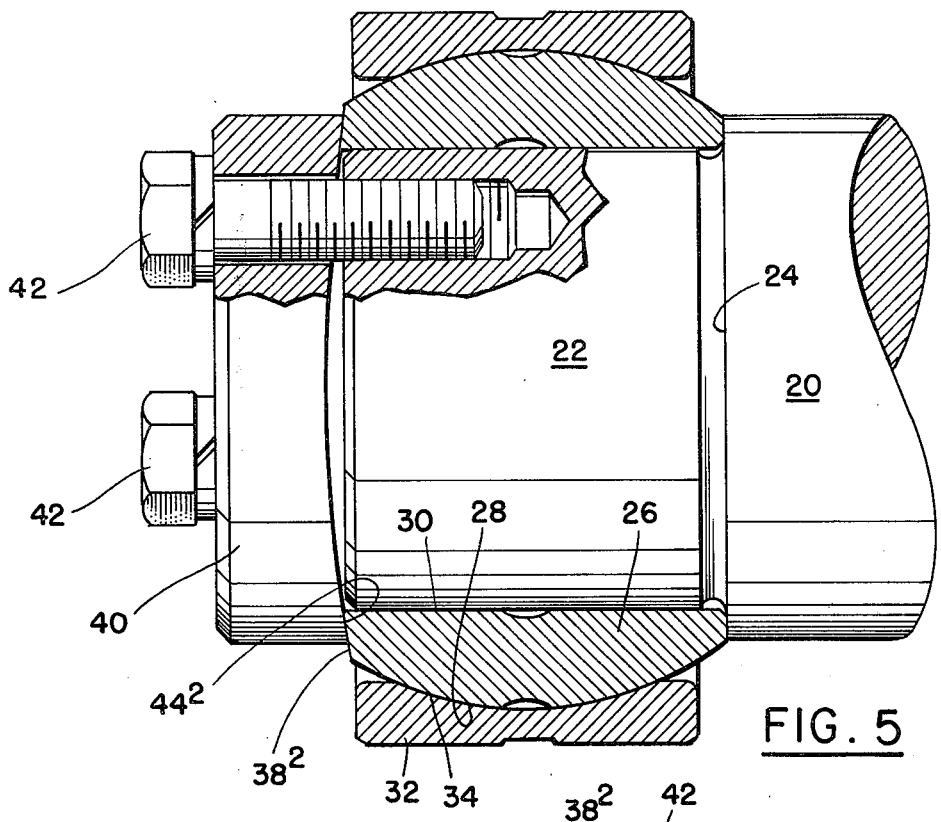
FIG. 5 is a second modification illustrated in axial section.
Figure 6:
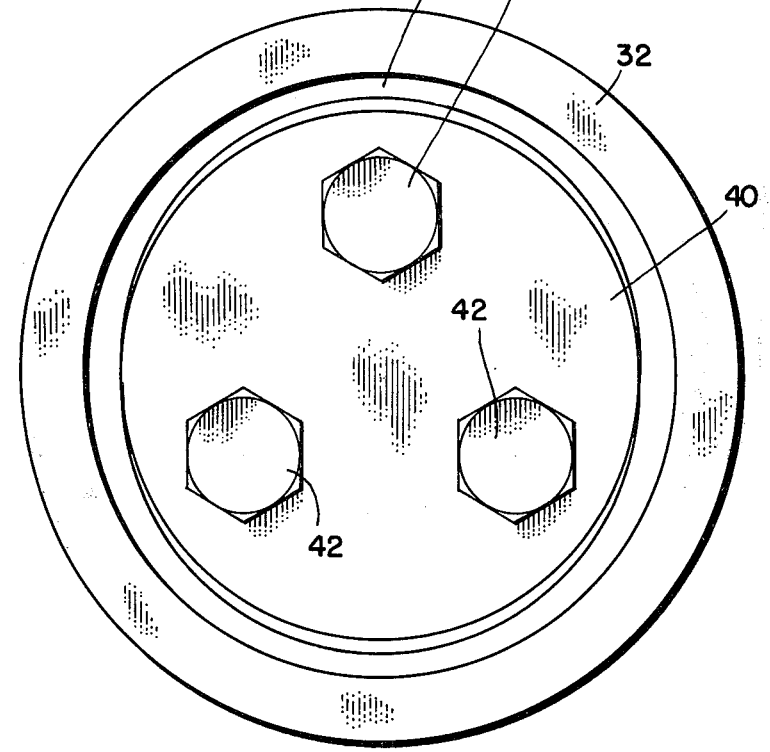
FIG. 6 is a left end view of the second modification.
Figure 7:
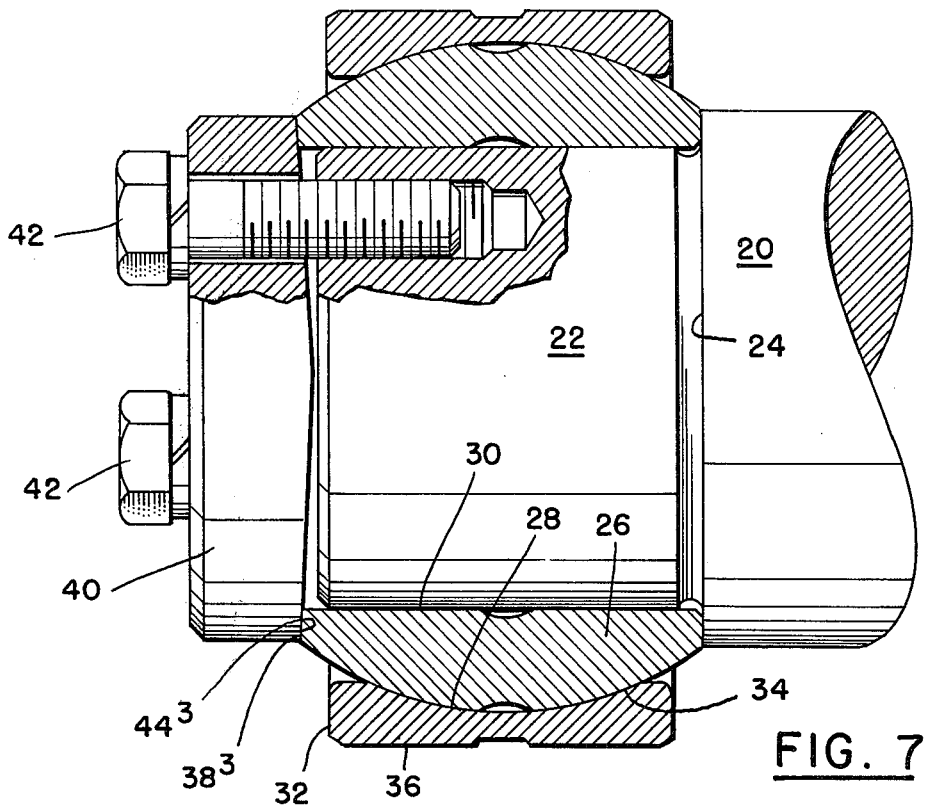
FIG. 7 is a view of the third modification, illustrated in axial section.
Figure 8:
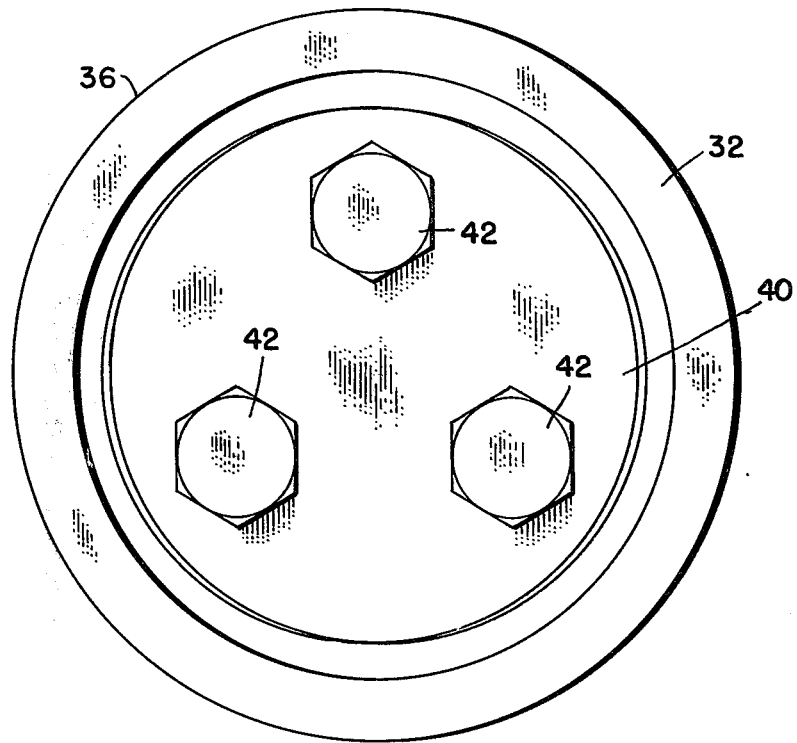
FIG. 8 is a left end view of FIG. 7.
Figure 9:
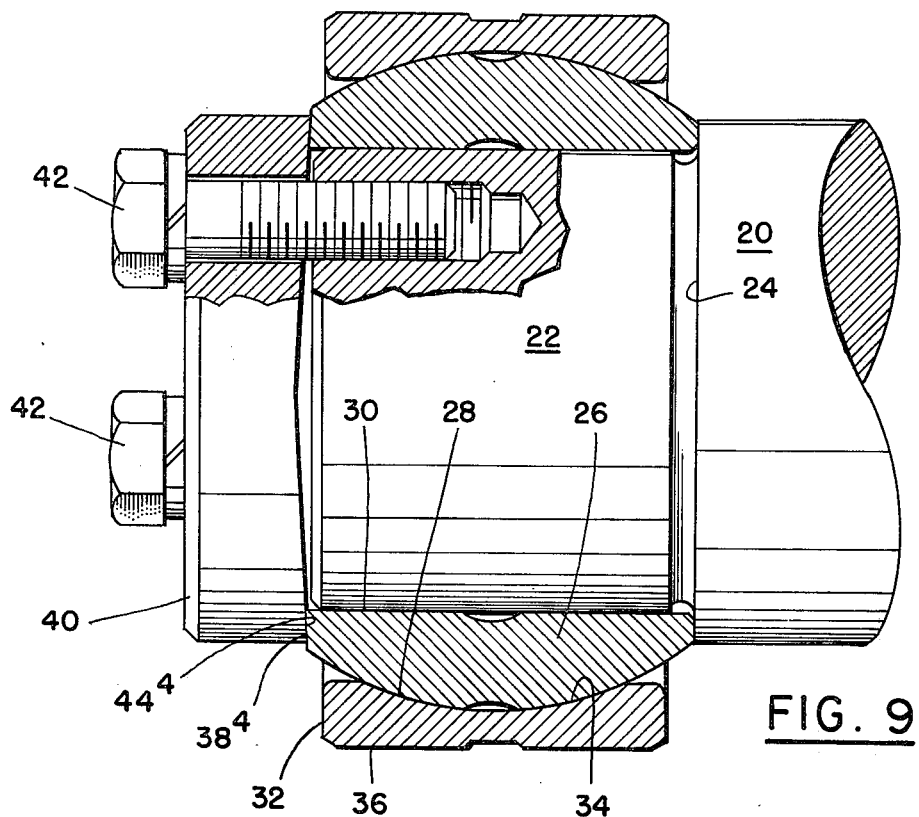
FIG. 9 is a view of the fourth modification illustrated in axial section.
Figure 10:
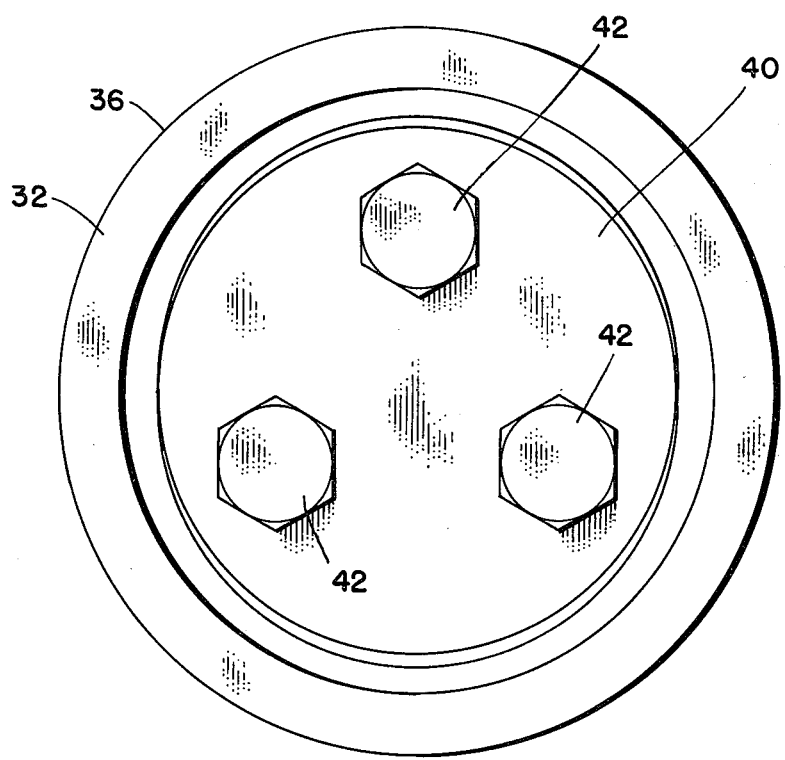
FIG. 10 is an end view from the left end.

Instead of a plane as in surfaces 38 and 44, the locking force may be exerted by curved surfaces 44' and 38' which conform forming a concave curve with respect to the end plate as in FIGS. 3 and 4 or a convex curve $44^2$ and mating face $38^2$ as in FIGS. 5 and 6, or as shown in FIGS. 7 and 8 the mating surfaces $44^3$ and $38^3$ may be conical in a concave way as illustrated in FIGS. 7 and 8 or the mating cones $44^4$ and $38^4$ may be convex as shown in FIGS. 9 and 10. As will be evident from the cross sections and end views of the respective FIGS. 7 through 10, by "conical" and "cone" is meant a roof-like or trough-like shape with the ridge line or line at the bottom of the trough running through the center.

In any case the surfaces of the end plate and the adjoining end of the inner race conform in shape.

In all of these forms the inner race may be mounted on the shaft with a relatively loose fit to allow for rotational adjustment, in order to match the corresponding face of the end plate. In each of these cases, however, once the parts are locked, no relative motion is permitted between the bore of the inner race and the shaft since by the angle, radius or taper they are locked together against the shoulder 24 on the shaft.

In view of my invention and disclosure, variations and modifications to meet individual whim or particular need will doubtless become evident to others skilled in the art to obtain all or part of the benefits of my structure shown, and I, therefore, claim all such insofar as they fall within the reasonable spirit and scope of my claims.

Having thus described my invention what I claim as new and desire to secure by Letters Patent is:

1. A self-aligning bushing setup comprising a shaft, an inner race having a position surrounding one end of the shaft, the inner race having a spherical type outer surface and having an inner and an outer end relative to the shaft as a whole longitudinally speaking, an outer race having a spherical type inner surface mating with the spherical type outer surface of the inner race to enable relative movement as between inner and outer race, an end plate across the outer end of the inner race and having an inner end surface mating with an outer end surface of that inner race, said respective mating end surfaces preventing relative rotation between the end plate and the inner race by at least part of the mating surfaces of the end plate and the inner race having an oblique angle with respect to the axis of the shaft and being assymetrical composed to any figure of rotation developed symmetrically about the axis of rotation of the shaft, means for positively affixing the end plate to the shaft, and means to prevent the inner race from moving axially out of the effective mating position with the end plate.

2. A self-aligning bushing according to claim 1, in which the means to prevent the inner race from moving axially out of mating position with the end plate is a shoulder on the shaft cooperating with the inner end of the inner race.

3. A self-aligning bushing according to claim 1, in which the end plate is affixed to the shaft by bolts.

4. A self-aligning bushing according to claim 1, in which the mating surface of the end plate and the end of the inner race lie in a plane.

5. A self-aligning bushing according to claim 1, in which two mating surfaces of the end plate and the end of the inner race lie in a curve which is concave with respect to the end plate.

6. A self-aligning bushing according to claim 1, in which two mating surfaces between the end plate and the one end of the inner race lie in a curve which is convex with respect to the end plate.

7. A self-aligning bushing according to claim 1, in which the mating surfaces of the end plate and the one end of the inner race are tapered from the outside toward the interior in a manner which is concave with respect to the end plate.

8. A self-aligning bushing according to claim 1, in which the mating surfaces of the end plate and the one end of the inner race are tapered from the outside toward the interior in a manner which is convex with respect to the end plate.

* * * * *